United States Patent
Kumar et al.

(10) Patent No.: US 9,032,375 B2
(45) Date of Patent: May 12, 2015

(54) PERFORMANCE BOTTLENECK IDENTIFICATION TOOL

(75) Inventors: Prathiba Kumar, Nadu (IN); Rajan Ravindran, Bangalore (IN); Satish K. Sadasivam, Erode (IN); Madhavi G. Valluri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 13/095,792

(22) Filed: Apr. 27, 2011

(65) Prior Publication Data

US 2012/0278594 A1 Nov. 1, 2012

(51) Int. Cl.
*G06F 9/30* (2006.01)
*G06F 11/36* (2006.01)
*G06F 11/34* (2006.01)

(52) U.S. Cl.
CPC ........ *G06F 11/3612* (2013.01); *G06F 11/3476* (2013.01); *G06F 11/3409* (2013.01); *G06F 2201/865* (2013.01); *G06F 2201/88* (2013.01)

(58) Field of Classification Search
CPC ............ G06F 11/3612; G06F 11/3636; G06F 11/3476
USPC ......................................................... 717/131
See application file for complete search history.

(56) References Cited

U.S. PATENT DOCUMENTS

| | | | |
|---|---|---|---|
| 4,435,759 A * | 3/1984 | Baum et al. ..................... 714/44 | |
| 4,980,821 A | 12/1990 | Koopman et al. | |
| 5,053,952 A | 10/1991 | Koopman, Jr. et al. | |
| 6,470,464 B2 | 10/2002 | Bertram et al. | |
| 6,557,035 B1 | 4/2003 | McKnight | |
| 6,961,794 B2 | 11/2005 | Atherton et al. | |
| 7,277,826 B2 | 10/2007 | Castelli et al. | |
| 7,370,243 B1 | 5/2008 | Grohoski et al. | |
| 7,467,198 B2 * | 12/2008 | Goodman et al. ............ | 709/223 |
| 7,610,266 B2 | 10/2009 | Cascaval et al. | |
| 7,653,899 B1 | 1/2010 | Lindahl et al. | |

(Continued)

OTHER PUBLICATIONS

"Joshua J. Yi, Ajay Joshi , Resit Sendag3, Lieven Eeckhout, and David J. Lilja";"Analyzing the Processor Bottlenecks in SPEC CPU 2000";"2006";"10 pages".*

(Continued)

*Primary Examiner* — Anna Deng
*Assistant Examiner* — Brahim Bourzik
(74) *Attorney, Agent, or Firm* — Damion Josephs

(57) ABSTRACT

A computer program product for identifying bottlenecks includes a computer readable storage medium with stored computer readable program instructions. The computer readable program instructions, when executed, provide a data collector module, a mapper module, and an analyzer module that are collectively configured to read mapped data and configuration files, and identify, based upon the mapped data and the configuration files, an undesirable bottleneck condition that causes a computer program to run inefficiently. A method includes reading a configuration file that includes data regarding processor components, and collecting data from hardware activity counters based upon the configuration file. The method also includes mapping the collected data to corresponding sections of code of a computer program, reading the mapped data and the configuration file, and identifying, based upon the reading of the mapped data and the configuration file, an undesirable bottleneck condition that causes the processor to run the computer program inefficiently.

15 Claims, 6 Drawing Sheets

(56) References Cited

U.S. PATENT DOCUMENTS

| | | | |
|---|---|---|---|
| 7,707,386 B2 * | 4/2010 | Kohno et al. | 712/36 |
| 7,770,140 B2 | 8/2010 | Bell et al. | |
| 7,844,928 B2 | 11/2010 | Bell et al. | |
| 7,861,228 B2 | 12/2010 | Osecky et al. | |
| 7,925,674 B2 * | 4/2011 | Wang et al. | 707/802 |
| 2003/0061324 A1 | 3/2003 | Atherton et al. | |
| 2005/0050404 A1 | 3/2005 | Castelli et al. | |
| 2006/0271827 A1 | 11/2006 | Cascaval et al. | |
| 2007/0011330 A1 * | 1/2007 | Dinker et al. | 709/226 |
| 2007/0220513 A1 | 9/2007 | Hwang | |
| 2008/0189569 A1 | 8/2008 | Chu | |
| 2008/0307203 A1 | 12/2008 | Bell, Jr. et al. | |
| 2009/0177642 A1 * | 7/2009 | Chung et al. | 707/5 |
| 2009/0182994 A1 | 7/2009 | Bell, Jr. et al. | |
| 2009/0183127 A1 | 7/2009 | Bell et al. | |
| 2009/0199138 A1 | 8/2009 | Bell et al. | |
| 2009/0260018 A1 | 10/2009 | Das et al. | |
| 2009/0276190 A1 | 11/2009 | Bell, Jr. et al. | |
| 2009/0276191 A1 | 11/2009 | Bell, Jr. et al. | |
| 2010/0037214 A1 | 2/2010 | Das et al. | |
| 2010/0180255 A1 | 7/2010 | Chung et al. | |
| 2010/0218190 A1 | 8/2010 | Das et al. | |

OTHER PUBLICATIONS

IBM Corporation, A Holistic Approach towards Automatic Performance Analysis and Tuning, 2009, 40 pages.

ACM, Inc., Bottleneck Detection in Parallel File Systems with Trace-Based Performance Monitoring, Jan. 13, 2011, 2 pages.

G. Hazari, M. P. Desai, G. Srinivas; Bottleneck Identification Techniques leading to Simplified Performance Models for efficient Design Space Exploration in VLSI Memory Systems; Presented at the 23rd International Conference on VLSI Design (Bangalore, India, Jan. 3-7, 2010); Published in VLSI Design, 2010; 6 pages.

* cited by examiner

| Module | Hot | Address Range | Bottleneck | Details |
|---|---|---|---|---|
| fiber_root1 | 40% | 0x100040 – 0x100254 | Y | Branch bottleneck: Branch Mispredictions |
|  | 20% | 0x100544 – 0x100620 | Y | LSU Reject – Load Miss Queue (LMQ) |
| tiss_mainline | 15% |  | N |  |
| out_jack | 10% | 0x100670 – 0x100740 | Y | FPU Divide instruction Stalls |
| ... |  |  |  | ... |

FIG. 5

PERFORMANCE BOTTLENECK IDENTIFICATION TOOL

BACKGROUND

The present invention relates to a bottleneck identification and reporting tool, and more specifically to a module level bottleneck identification and reporting tool that collects data and identifies, based upon the collected data, an undesirable bottleneck condition that causes a computer program to run inefficiently. During performance analysis, an analyst determines a computer program's behavior based upon information gathered as that program is executed by a processor of a computer. For example, the analyst determines sections of code of the computer program that the processor is running inefficiently, such as sections of code that are taking longer than expected to execute and/or occupying more memory than expected. High performance computing involves the use of parallel supercomputers and/or computer clusters. A computer cluster is a computing system that includes multiple processors linked together forming a single system. A high performance computing (HPC) application is characterized by huge datasets and/or complex, parallelized algorithms that run for prolonged periods of times, such as one or more days. HPC applications may be run on parallel supercomputers and/or computer clusters.

BRIEF SUMMARY

According to one embodiment of the present invention, a computer program product for identifying bottlenecks may include a computer readable storage medium having computer readable program instructions embodied therewith. When executed, the computer readable program instructions provide a data collector module configured to read a configuration file that includes data regarding components of a processor. The data collector module is further configured to collect data from hardware activity counters of the processor based upon the configuration file; a mapper module configured to map the collected data from the data collector module to corresponding sections of code of a computer program being executed by the processor; and an analyzer module configured to read the mapped data and the configuration file. That analyzer module is also configured to identify, based upon the mapped data and the configuration file, an undesirable bottleneck condition that causes the computer program to run inefficiently.

According to another embodiment of the present invention, a method may include reading a configuration file that includes data regarding components of a processor; collecting data from hardware activity counters of the processor based upon the configuration file; mapping the collected data to corresponding sections of code of a computer program being executed by the processor; and reading the mapped data and the configuration file. The method also involves identifying, based upon the reading of the mapped data and the configuration file, an undesirable bottleneck condition that causes the processor to run the computer program inefficiently.

According to a further embodiment of the present invention, a computer program product for identifying bottlenecks may include a computer readable storage medium having computer readable program instructions embodied therewith. The computer readable program instructions are executed by a computer to read a configuration file that includes data regarding components of a processor; collect data from hardware activity counters of the processor based upon the configuration file; map the collected data to corresponding sections of code of a computer program being executed by the processor; and read the mapped data and the configuration file. Those instructions are also executed by a computer to identify one or more sections of the code that are bottlenecks when the processor is running the computer program and the one or more processor components that are associated with the bottlenecks.

BRIEF DESCRIPTION OF THE SEVERAL VIEWS OF THE DRAWINGS

FIG. 5 depicts an example of a bottleneck identification report.

DETAILED DESCRIPTION

Figure 1:
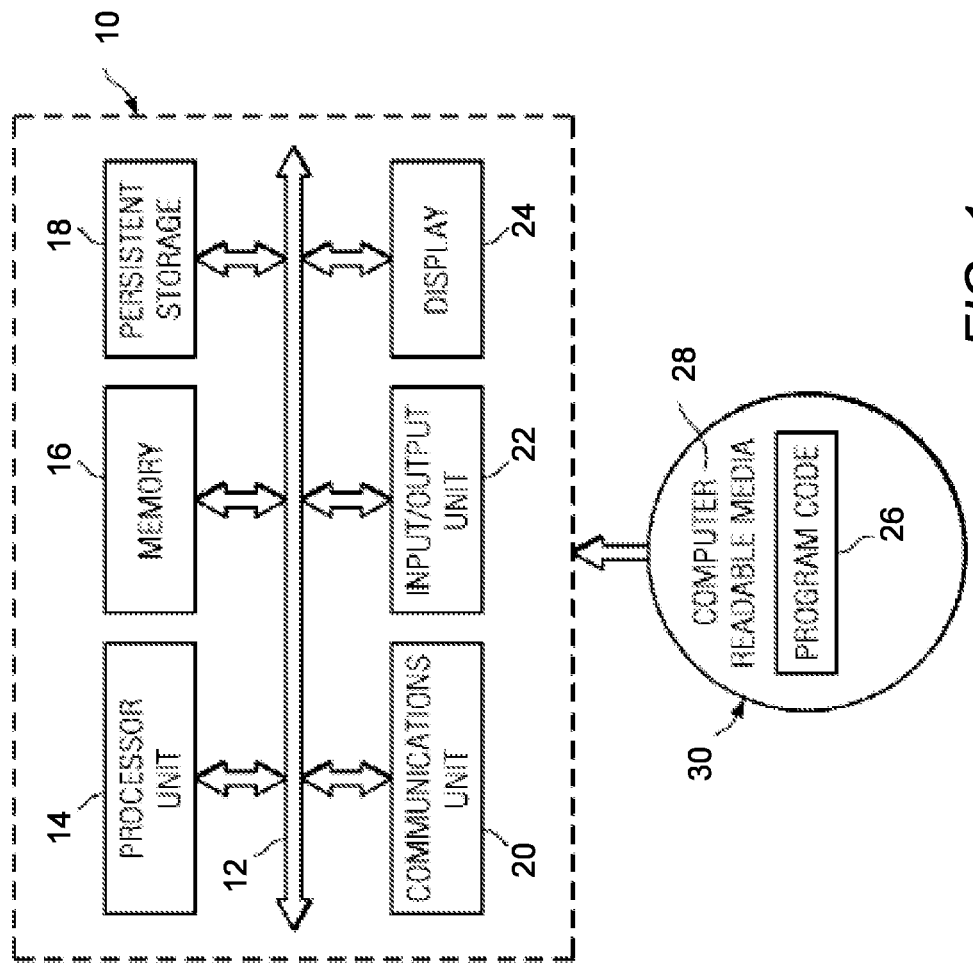
FIG. 1 schematically depicts an example of a computer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF cable, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to FIG. 1, a block diagram of a computer 10 is shown in which illustrative embodiments may be implemented. Computer 10 may include computer-usable program code or instructions implementing the processes may be located for the illustrative embodiments. In this example, computer 10 includes a communications pathway 12, which provides communications between a processor unit 14, memory 16, a persistent storage 18, a communications unit 20, an input/output (I/O) unit 22, and a display 24. In other examples, computer 10 may include more or fewer devices or units.

Processor unit 14 may serve to execute instructions for software that may be loaded into memory 16. Processor unit 14 may be a set of one or more processors or may be a multi-processor core, depending on the particular implementation. Further, processor unit 14 may be implemented using one or more heterogeneous processor systems in which a main processor is present with secondary processors on a single chip. As another example, processor unit 14 may be a symmetric multi-processor system containing multiple processors of the same type.

Memory 16 and persistent storage 18 are examples of storage devices. A storage device is any piece of hardware that is capable of storing information either on a temporary basis and/or a permanent basis. Memory 16 may be, for example, a random access memory or any other suitable volatile or non-volatile storage device. Persistent storage 18 may take various forms depending on the particular implementation. For example, persistent storage 18 may contain one or more components or devices. For example, persistent storage 18 may be a hard drive, a flash memory, a rewritable optical disk, a rewritable magnetic tape, or some combination of the above. The media used by persistent storage 18 also may be removable. For example, a removable hard drive may be used for persistent storage 18.

Communications unit 20, in these examples, provides for communications with other data processing systems or devices. For example, communications unit 20 may be a network interface card. Communications unit 20 may provide communications through the use of either or both physical and wireless communications links.

Input/output unit 22 allows for input and output of data with other devices that may be connected to computer 10. For example, input/output unit 22 may provide a connection for user input through a keyboard and mouse. Further, input/output unit 22 may send output to a printer. Display 24 displays information to a user.

Instructions for the operating system and applications or programs are located on persistent storage 18. These instructions may be loaded into memory 16 for execution by processor unit 14. The processes of the different embodiments may be performed by processor unit 14 using computer implemented instructions, which may be located in a memory, such as memory 16. Those instructions are referred to as program code, computer-usable program code, or computer-readable program code that may be read and executed by a processor in processor unit 14. The program code in the different embodiments may be embodied on different physical or tangible computer-readable media, such as memory 16 or persistent storage 18.

Program code 26 may be located in a functional form on a computer-readable media 28 that is selectively removable and may be loaded onto or transferred to computer 10 for execution by processor unit 14. Program code 26 and computer-readable media 28 form computer program product 30 in the example of FIG. 1. In one example, computer-readable media 28 may be in a tangible form, such as, for example, an optical or magnetic disc that is inserted or placed into a drive or other device that is part of persistent storage 18 for transfer onto a storage device, such as a hard drive that is part of persistent storage 18. In a tangible form, computer-readable media 28 also may take the form of a persistent storage, such as a hard drive, a thumb drive, or a flash memory that is connected to computer 10. The tangible form of computer-readable media 28 is also referred to as computer-recordable storage media. In some instances, computer-recordable media 28 may not be removable.

Alternatively, program code 26 may be transferred to computer 10 from computer-readable media 28 through a communications link to communications unit 20 and/or through a connection to input/output unit 22. The communications link and/or the connection may be physical or wireless in the examples. The computer-readable media also may take the form of non-tangible media, such as communications links or wireless transmissions containing the program code. The different components illustrated for computer 10 are not meant to provide architectural limitations to the manner in which different embodiments may be implemented. The different illustrative embodiments may be implemented in a data processing system including components in addition to, or in place of, those illustrated for computer 10. As one example, a storage device in computer 10 is any hardware apparatus that may store data. Memory 16, persistent storage 18, and computer-readable media 28 are examples of storage devices in tangible forms.

In another example, a bus system may be used to implement communications pathway 12 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 16 or a cache such as found in an interface and memory controller hub that may be present in communications pathway 12. In one example, computer 10 may be a high performance computer that includes parallel supercomputers and/or computer clusters.

Figure 2:
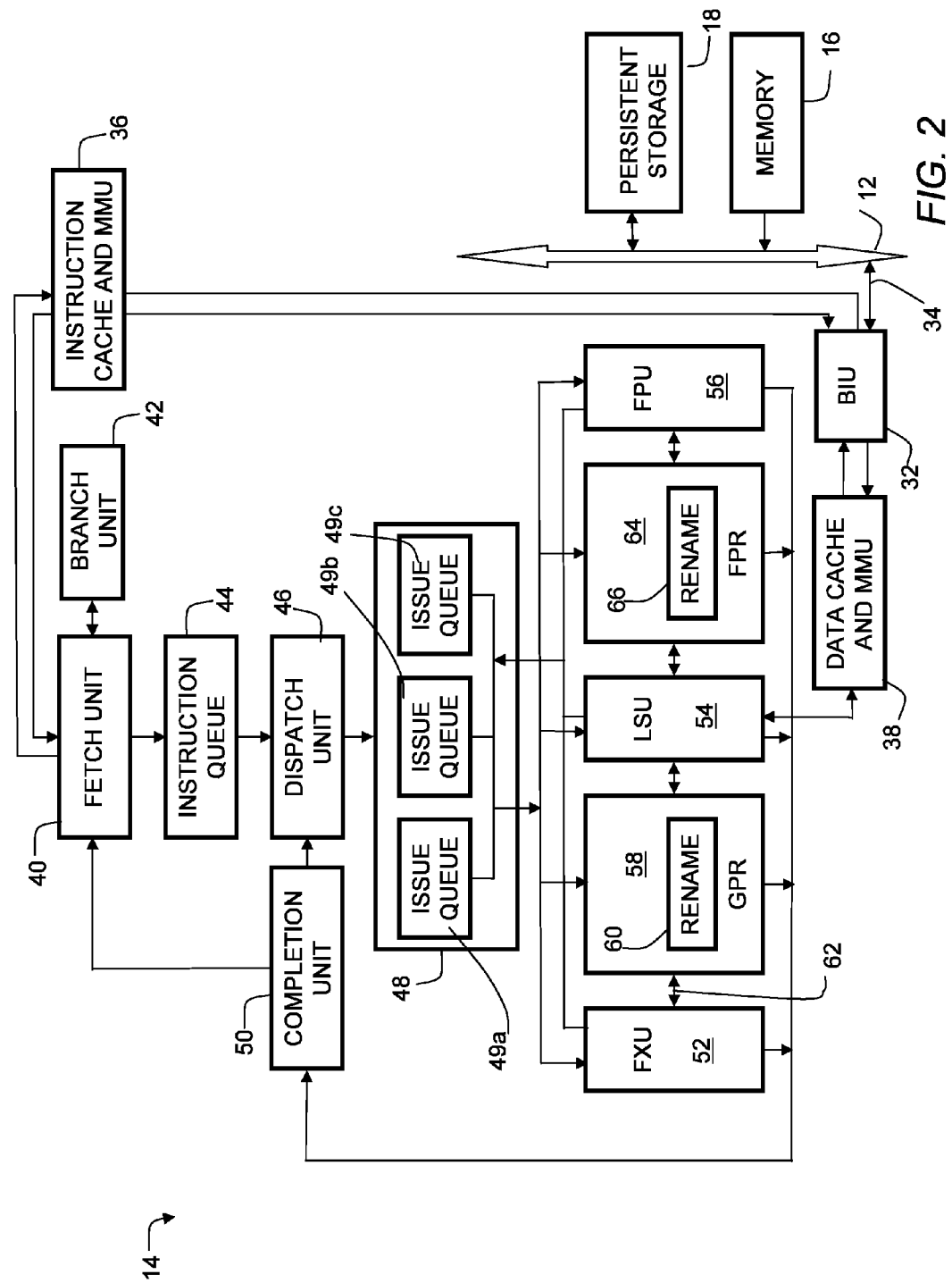
FIG. 2 schematically depicts an example of a processor unit of the computer of FIG. 1.

Referring now to FIG. 2, an example of a processor unit 14 is shown. Processor unit 14 may include, for example, an integrated circuit superscalar microprocessor fabricated on a single monolithic semiconductor substrate. The processor unit may include various execution units, registers, buffers, memories, and other functional units as discussed in greater detail below. Processor unit 14 may be coupled to communications pathway 12 via a bus interface unit (BIU) 32 and a processor bus 34, which may include address, data, and control buses. BIU 32 may control the transfer of information between processor unit 14 and other devices coupled to communications pathway 12, such as memory 16 and persistent storage 18. Processor unit 14 also may include other devices coupled to communications pathway 12.

BIU 32 may be connected to an instruction cache and memory management unit 36 and a data cache and memory management unit 38 within processor unit 14. High-speed caches, such as those within instruction cache 36 and data cache 38, may enable processor unit 14 to achieve relatively fast access times to a subset of data or instructions previously transferred from memory 16, which may improve the speed of operation of computer 10. Data and instructions stored within data cache 38 and instruction cache 36, respectively, may be identified and accessed by address tags, each comprising a selected number of bits (such as the high-order bits) of the memory physical address in which the data or instruction reside.

A sequential fetch unit 40 may retrieve instructions for execution from instruction cache 36 during each clock cycle. In some embodiments, if sequential fetch unit 40 retrieves a branch instruction from instruction cache 36, the branch instruction may be forwarded to a branch processing unit (BPU) 42 for execution. Sequential fetch unit 40 may forward non-branch instructions to an instruction queue 44, where the instructions are stored temporarily pending execution by other functional units of processor unit 14. A dispatch unit 44 may be responsible for retrieving stored instructions from queue 44 and forwarding the instructions to an issue unit (ISU) 48. Dispatch unit 44 may schedule dispatch of instructions to an issue unit 48 based, in part, upon instruction completion information received from a completion unit 50.

ISU 48 may include one or more issue queues 49a, 49b, 49c, etc. (which may be collectively or generically referred to issues queue(s) 49). ISU 48 may be responsible for maintaining fully loaded pipelines by issuing new instructions in each cycle to the execution units whenever possible. In some embodiments, instructions may be issued from ISU 48 out-of-order. The execution circuitry of processor unit 14, in addition to BPU 42, may include multiple functional units for executing sequential instructions, including a fixed-point-unit (FXU) 52, load/store unit (LSU) 54, and floating-point unit (FPU) 56. Each of execution units 52, 54, and 56 may execute one or more instructions of a particular type of sequential instruction during each processor cycle. For example, FXU 52 may perform fixed-point mathematical and logical operations, such as addition, subtraction, ANDing, ORing, and XORing, utilizing source operands received from specified general purpose registers (GPRs) 58. Following the execution of a fixed-point instruction, FXU 52 may output the data results of the instruction to GPR buffers 60, which may provide storage for the result received on a result bus 62.

FPU 56 may perform single and/or double-precision floating-point arithmetic and logical operations, such as floating-point multiplication and division, on source operands received from floating-point registers (FPRs) 64. FPU 56 may output data resulting from the execution of floating-point instructions to selected FPR buffers 66, which may store the result data. LSU 54 may execute floating-point and fixed-point load instructions, which load data from data cache 38, a lower level cache memory (not depicted), or memory 16. That data is loaded into selected GPRs 58 and/or FPRs 64 and floating-point and fixed-point store instructions, which store data from a selected one of GPRs 58 or FPRs 64 to data cache 38 and, ultimately, to memory 16.

Figure 3:
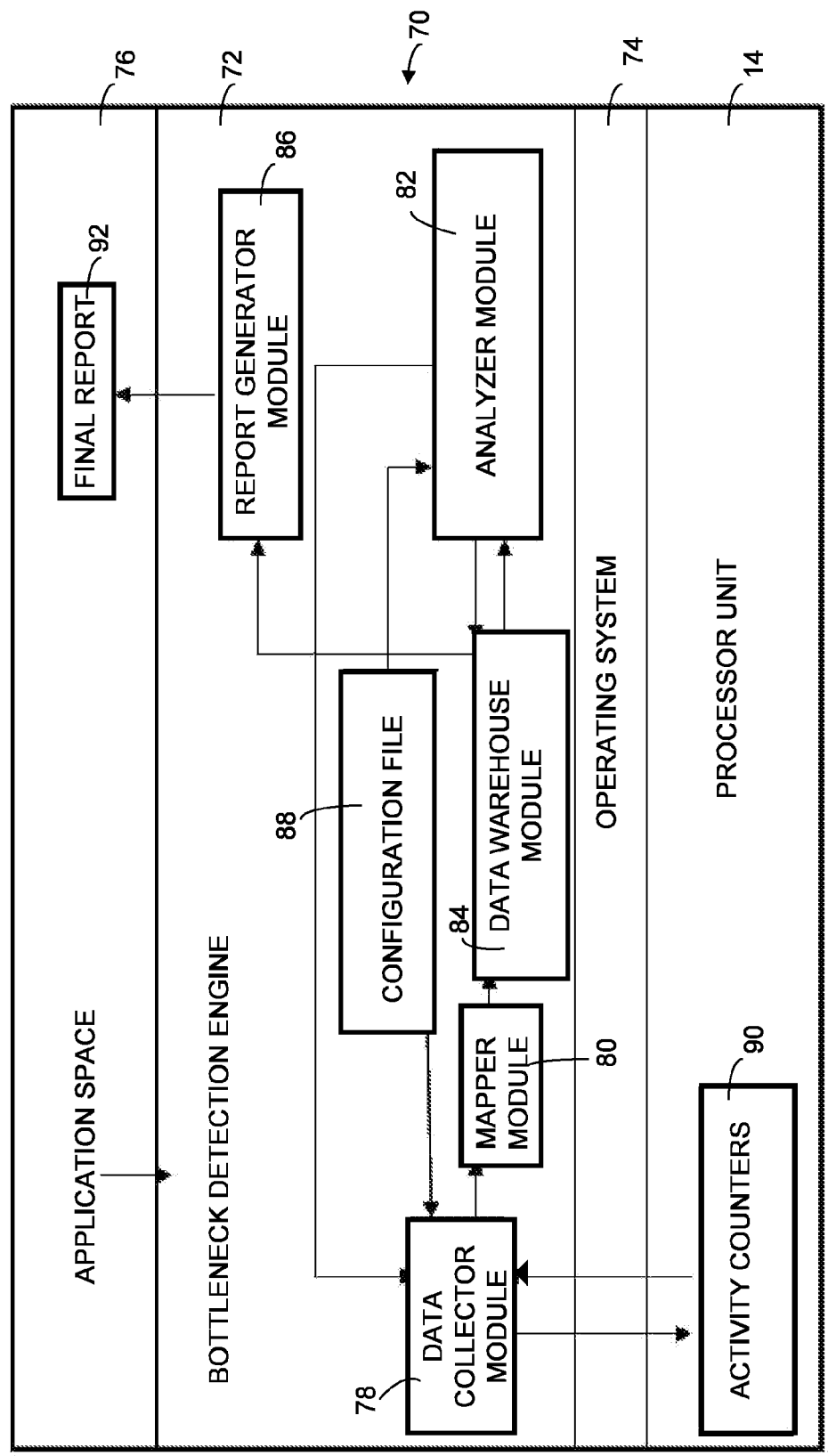
FIG. 3 schematically depicts an example of a bottleneck identification and reporting tool.

Referring now to FIG. 3, an example of a bottleneck identification and reporting tool 70 is shown. The tool may be in the form of a computer program product for identifying bottlenecks. That computer program product may include a computer readable storage medium having computer readable program instructions embodied therewith. Those instructions may, when executed, provide for a bottleneck detection engine 72. The bottleneck detection engine may be referred to operate between an operating system 74 and an application space 76. The bottleneck detection engine may include a data collector module 78, a mapper module 80, an analyzer module 82, a data warehouse module 84, and a report generator module 86.

Data collector module 78 may be configured to read a configuration file 88 and/or collect data from hardware activity counters 90 of processor unit 14 based upon the configuration file. The configuration file may include data regarding components of the processor unit. For example, configuration file 88 may include data regarding the architecture and/or microarchitecture of processor unit 14, such as cycle information, including information on stall cycles, flush cycles, reject cycles, and/or useful cycles. Additionally, the configuration file may provide a way to attribute time spent (e.g., the cycles the program ran) to various units of the microarchitecture. Moreover, the configuration file may contain a detailed breakdown of various CPI stall components which contribute to the bottleneck condition. For instance the configuration file may contain high level detailed information, such as stalls due to LSU, stalls due to VSU, stalls due to IFU, etc. If a user is interested in knowing additional or finer details about the bottleneck, the configuration file may contain further breakdown information. For example, LSU stalls may be further broken down into stalls due to Rejects, stalls due to D-cache misses, stalls due to Store instructions, etc. That breakdown information may provide a more detailed picture of the bottleneck condition in the code. If further breakdown information of an individual component is possible, that information can be added or represented in the configuration file. Based on the configuration file, the analyzer module may analyze the code and report the bottleneck to the user.

The data collector module may initialize the hardware activity counter(s) to collect an initial set of data based upon inputs from the configuration file. The initial set of data may include any suitable information, such as key microarchitectural metrics and events associated with the processor microarchitecture based upon inputs from the configuration file. Data collector module 78 may then store the initial set of data in data warehouse module 84. The data collector module may store the initial set of data with key tag(s) that correspond to architectural event(s). The data collector module may collect additional data based upon instructions from analyzer module 82, as further described below.

Mapper module 80 may be configured to map the collected data from the data collector module to corresponding sections of code of a computer program (or application) being executed by processor unit 14. The mapper module may map the collected data to various modules or sections of the code. Additionally, mapper module 80 may provide mapping of the assembly code to the high-level code. The mapper module may read the collected data from data warehouse module 84 and store the mapped data in the data warehouse module. After execution, the mapper module may call analyzer module 82. Alternatively, the analyzer module may poll one or more of the other modules to determine when it should start its analysis.

Analyzer module 82 may be configured to read mapped data from mapper module 80 and configuration file 88, and/or to identify, based upon the mapped data and configuration file, an undesirable bottleneck condition that causes the computer program to run inefficiently. The analyzer module may be configured to identify the undesirable bottleneck condition as section(s) of code that cause processor unit 14 to run the computer program inefficiently. Additionally, analyzer module 82 may be configured to identify, based upon the mapped data and/or configuration file 88, component(s) of processor unit 14 associated with the identified section(s) of code that cause processor unit 14 to run the computer program inefficiently. For example, the analyzer module may correlate instructions information and hardware activity data with microarchitecture information. Additionally, analyzer module 82 may isolate processor components and identify particular bottlenecks, such as LSU bottleneck, branch bottleneck, issue queue bottleneck, global completion table bottleneck, and cache bottleneck, based upon high level components listed in configuration file 88. The analyzer module may be configured to store the identified section(s) of code and the identified component(s) of processor unit 14 in data warehouse module 84.

Based upon analysis of the initial set of data, analyzer module 82 may be configured to identify a high-level bottleneck condition and/or the processor component(s) involved with that condition. If a further breakdown of the bottleneck is possible from the configuration file information, then the analyzer module may be configured to identify possible bottleneck indicator events to monitor and/or instruct the data collector module to collect additional data from processor component(s) identified previously. The additional data may include, for example, further event data associated with section(s) of code that may be causing processor unit 14 to run the computer program inefficiently, such as data gathered from bottleneck breakdown information in the configuration file.

Data collector module 78 may be configured, upon receiving a request from analyzer module 82, to collect additional data from the processor components identified previously. For example, the data collector module may be configured to collect event data associated with section(s) of code that may be causing processor unit 14 to run the computer program inefficiently. Analyzer module 82 may be configured to analyze the additional data collected by data collector module 78 and identify portion(s) of the additional data that cause the processor to run the computer program inefficiently. Based upon analysis of the additional data, analyzer module 82 may be configured to determine if there is sufficient data to identify or pinpoint the bottleneck condition(s), such as at the lowest possible granularity given by the configuration file. If the data is insufficient, then the analyzer module may be configured to identify possible bottleneck indicator events to monitor and/or instruct the data collector module to collect further data from processor component(s) identified previously. The above process may be repeated until sufficient detailed data is available to pinpoint the bottleneck condition(s). When sufficient data is available, the analyzer module may be configured to store the results of the analysis in data warehouse module 84.

Data warehouse module may be configured to store data from one or more other modules, such as data collected by data collector module 78, mapped data from mapper module 80, data from analyzer module 82, and analysis results from the analyzer module. The data warehouse module may be further configured to be read by one or more of the other modules of bottleneck engine 72. Report generator module 86 may be configured to read analysis results stored in data warehouse module 84 and to format a report of the analysis.

Figure 4:
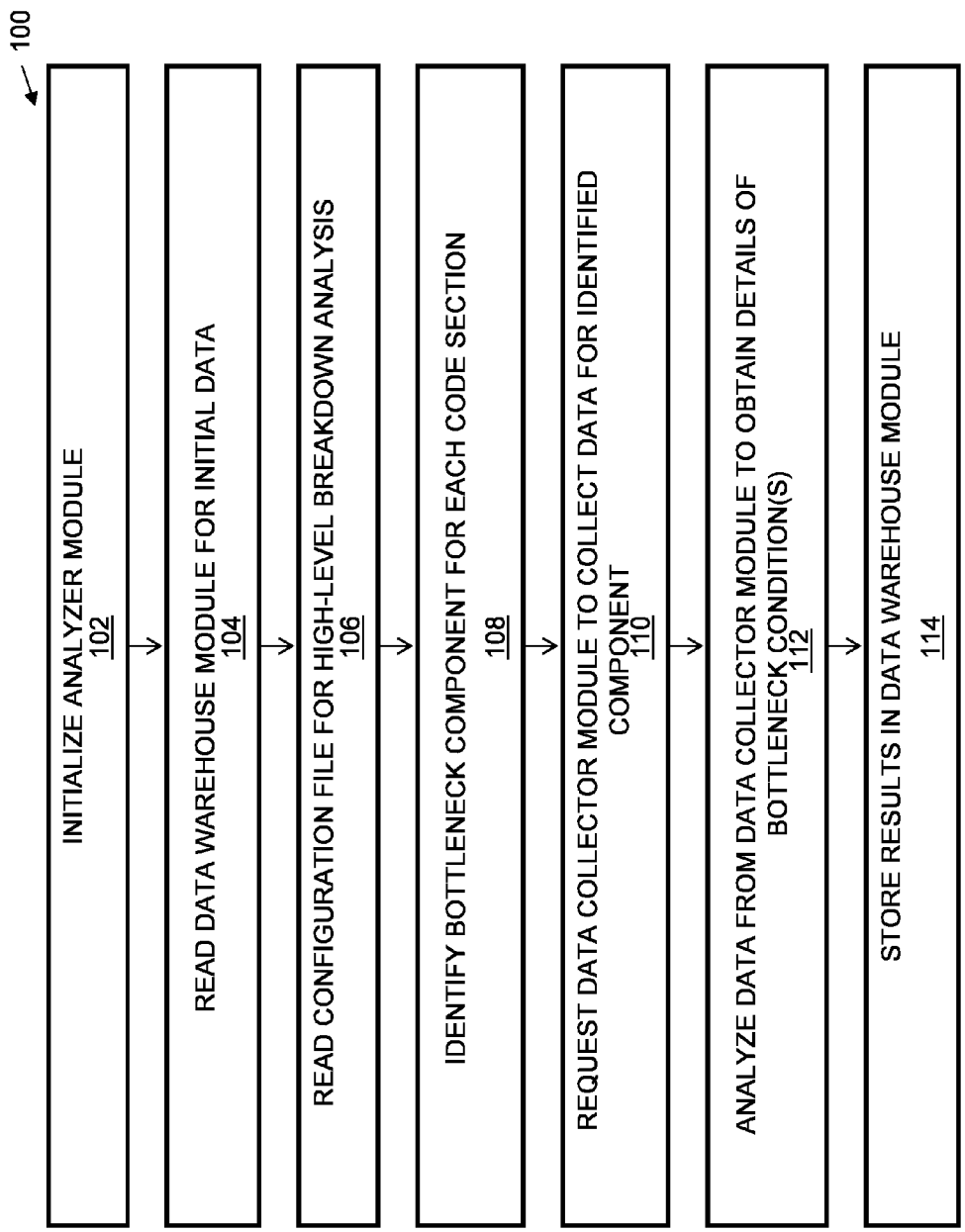
FIG. 4 depicts an example of method performed by an analyzer module of the bottleneck identification reporting tool of FIG. 3.

Referring now to FIG. 4, an example of a method 100 performed by analyzer module 82 is shown. While FIG. 4 shows illustrative steps of a method according to one embodiment, other embodiments may omit, add to, and/or modify any of the steps shown in that figure. In step 102, the analyzer module may initialize, such as when the mapper module calls the analyzer module. In step 104, the analyzer module may read the data warehouse module for initial data. In step 106, the analyzer module may read the configuration file for high-level breakdown analysis data. In step 108, the analyzer module may identify bottleneck component(s) for each code section. In step 110, the analyzer module may request the data collector module to collect data for identified components, such as the components identified in step 108. In step 112, the analyzer module may analyze the data obtained by the data collector module to obtain details of the bottleneck condition(s). In step 114, the analyzer module may store results of the analysis in the data warehouse module.

Referring now to FIG. 5, an example of a bottleneck identification report 92 generated by report generator module 86 is shown. The report includes a "Module" column 93, a "Hot" column 94, an "Address Range" column 95, a "Bottleneck" column 96, and a "Details" column 97. The Module column may include function(s) and/or sub-routine(s) in the computer program being analyzed. Hot column 94 may indicate, for example, delay of the particular function or subroutine identified in module column 93. Address Range column 95 may refer to section(s) of the code associated with the delay identified in the Hot column. Bottleneck column 96 may indicate whether the delay identified in the Hot column is high enough (or exceeds a predetermined threshold) that an undesirable bottleneck condition exists. Details column 97 may include additional information on the bottleneck, if one exists. Although bottleneck identification report 92 is shown with particular columns and formatting, the report may include any suitable columns and/or formatting.

Figure 6:
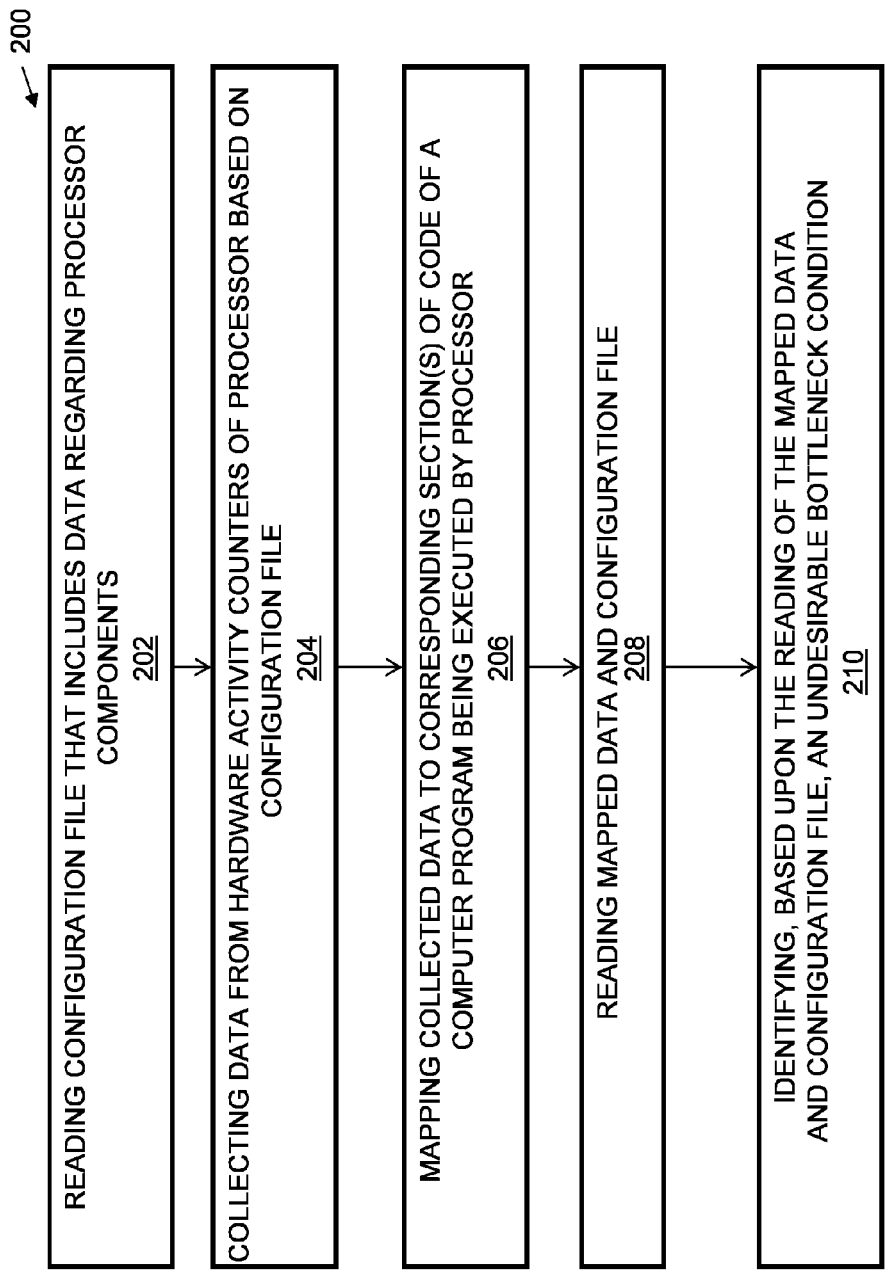
FIG. 6 depicts an example of a method of identifying bottlenecks.

Referring now to FIG. 6, an example of a method 200 of identifying bottlenecks is shown. While FIG. 6 shows illustrative steps of a method according to one embodiment, other embodiments may omit, add to, and/or modify any of the steps shown in that figure. In step 202, a configuration file that includes data regarding components of a processor may be read. The configuration file may, for example, include functions and protocols of the components. In step 204, data from hardware activity counters of the processor may be collected based upon the configuration file. In step 206, collected data may be mapped to corresponding sections of code of a computer program being executed by the processor. In step 208, mapped data and the configuration file may be read. In step 210, an undesirable bottleneck condition that causes the processor to run the computer program inefficiently may be identified based upon the reading of the mapped data and the configuration file. The identifying step may include identifying section(s) of code that are bottlenecks when the processor is running the computer program and/or the processor components associated with the bottlenecks.

Method 200 may include other steps. For example, method 200 may include reading the configuration file and/or collecting, from the identified processor components, event data associated with the identified section(s) of code based upon the configuration file. Additionally, method 200 may include identifying portion(s) of the collected event data that indicate bottlenecks when the processor is running the computer program. Moreover, method 200 may include storing the mapped data in memory and/or storing, in the memory, a list of the identified section(s) of code that are bottlenecks. Furthermore, method 200 may include reading data from memory and generating a report that includes the list of identified section(s) of code that are bottlenecks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

retrieving, by a computing device, a configuration file regarding a processor, including for each component of a plurality of components of the processor:

that a total number of stalls due to the component is to be collected, and;

that a number of each stall type of a plurality of stall types due to the component is to be collected;

first-collecting, by the computing device, data from hardware activity counters of the processor in correspondence with the total number of stalls due to each component identified in the configuration file that is to be collected;

mapping, by the computing device, the data collected from the hardware activity counters to corresponding sections of executable code of a computer program being executed by the processor, and mapping the corresponding sections of the executable code to corresponding sections of high-level source code of the computer program;

from the mapped data and the configuration file, identifying, by the computing device, a bottleneck condition causing the computer program to run inefficiently and one or more sections of the executable code and of the high-level source code that caused the bottleneck condition;

from the mapped data and the configuration file, identifying, by the computing device, a particular component of the processor at which the bottleneck condition occurred;

after identifying the particular component, reporting, by the computing device, the total number of stalls due to the particular component of the processor;

while the particular component is not identified at a desired level of granularity, second-collecting, by the computing device, additional data from the hardware activity counters in correspondence with the number of each stall type due to the particular component that is to be collected, wherein determining the desired level of granularity comprise determining if there is sufficient data to identify or pinpoint the bottleneck conditions at a lowest granularity based upon data from the configuration file that specifies breakdown possibility of a previous particular component; and after second-collecting the additional data, reporting, by the computing device, the number of each stall type due to the particular component of the processor, wherein the number of each stall type due to each component is not collected during first collecting, and the number of each stall type just due to the particular component at which the bottleneck condition occurred is collected during second collecting, such that the number of each stall type due to each other component at which the bottleneck condition did not occur is not collected during first collecting or during second collecting.

2. The method of claim 1, wherein the components of the processor for each of which the total number of stalls is to be collected comprises: an issue unit (ISU) and a load/store unit (LSU).

3. The method of claim 2, wherein the stall types for the LSU for each of which the number is to be collected comprises: rejects, cache misses, and store instructions.

4. The method of claim 1, wherein the total number of stalls due to each component is high-level information, and the number of each stall type due to each component is low-level information that is more granular than the high-level information.

5. The method of claim 1, further comprising reporting, by the computing device, for each section of the executable code or of the high-level source code of the computer program:
a name of the section;
an execution delay in the section;
an address range of the section;
whether the section contributed to the bottleneck condition; and
if the section contributed to the bottleneck condition, the number of stalls of the particular component attributable to the section and the number each stall type of the particular component attributable to the section.

6. A computer program product for identifying bottlenecks, the computer program product comprising:
a non-transitory computer readable storage medium having computer readable program instructions embodied therewith, the computer readable program instructions, when executed by a computing cause the computing device to:
retrieve a configuration file regarding a processor, including for each component of a plurality of components of the processor:
that a total number of stalls due to the component is to be collected, and;
that a number of each stall type of a plurality of stall types due to the component is to be collected;
first-collect data from hardware activity counters of the processor in correspondence with the total number of stalls due to each component identified in the configuration file that is to be collected;
map the data collected from the hardware activity counters to corresponding sections of executable code of a computer program being executed by the processor, and mapping the corresponding sections of the executable code to corresponding sections of high-level source code of the computer program;
from the mapped data and the configuration file, identify a bottleneck condition causing the computer program to run inefficiently and one or more sections of the executable code and of the high-level source code that caused the bottleneck condition;
from the mapped data and the configuration file, identify a particular component of the processor at which the bottleneck condition occurred;

after identifying the particular component, report the total number of stalls due to the particular component of the processor;

while the particular component is not identified at a desired level of granularity, second-collect additional data from the hardware activity counters in correspondence with the number of each stall type due to the particular component that is to be collected, wherein determining the desired level of granularity comprise determining if there is sufficient data to identify or pinpoint the bottleneck conditions at a lowest granularity based upon data from the configuration file that specifies breakdown possibility of a previous particular component; and after second-collecting the additional data, report the number of each stall type due to the particular component of the processor, wherein the number of each stall type due to each component is not collected during first collecting, and the number of each stall type just due to the particular component at which the bottleneck condition occurred is collected during second collecting, such that the number of each stall type due to each other component at which the bottleneck condition did not occur is not collected during first collecting or during second collecting.

7. The computer program product of claim 6, wherein the components of the processor for each of which the total number of stalls is to be collected comprises: an issue unit (ISU) and a load/store unit (LSU).

8. The computer program product of claim 7, wherein the stall types for the LSU for each of which the number is to be collected comprises: rejects, cache misses, and store instructions.

9. The computer program product of claim 6, wherein the total number of stalls due to each component is high-level information, and the number of each stall type due to each component is low-level information that is more granular than the high-level information.

10. The computer program product of claim 6, wherein the computer readable program instructions, when executed by the processor, further cause the processor to report, for each section of the executable code or of the high-level source code of the computer program:
a name of the section;
an execution delay in the section;
an address range of the section;
whether the section contributed to the bottleneck condition; and
if the section contributed to the bottleneck condition, the number of stalls of the particular component attributable to the section and the number each stall type of the particular component attributable to the section.

11. A system comprising:
a processor;
a storage device storing:
a configuration file regarding a target processor, including for each component of a plurality of components of the target processor:
that a total number of stalls due to the component is to be collected, and:
that a number of each stall type of a plurality of stall types due to the component is to be collected;
a bottleneck identification computer program that when executed by the processor causes the processor to:
first-collect data from hardware activity counters of the target processor in correspondence with the total number of stalls due to each component identified in the configuration file that is to be collected;

map the data collected from the hardware activity counters to corresponding sections of executable code of a target computer program being executed by the target processor, and mapping the corresponding sections of the executable code to corresponding sections of high-level source code of the target computer program;

from the mapped data and the configuration file, identify a bottleneck condition causing the target computer program to run inefficiently and one or more sections of the executable code and of the high-level source code that caused the bottleneck condition;

from the mapped data and the configuration file, identify a particular component of the target processor at which the bottleneck condition occurred;

after identifying the particular component, report the total number of stalls due to the particular component of the target processor;

while the particular component is not identified at a desired level of granularity, second-collect additional data from the hardware activity counters in correspondence with the number of each stall type due to the particular component that is to be collected, wherein determining the desired level of granularity comprise determining if there is sufficient data to identify or pinpoint the bottleneck conditions at a lowest granularity based upon data from the configuration file that specifies breakdown possibility of a previous particular component; and after second-collecting the additional data, report the number of each stall type due to the particular component of the target processor, wherein the number of each stall type due to each component is not collected during first collecting, and the number of each stall type lust due to the particular component at which the bottleneck condition occurred is collected during second collecting, such that the number of each stall type due to each other component at which the bottleneck condition did not occur is not collected during first collecting or during second collecting.

12. The system of claim 11, wherein the components of the target processor for each of which the total number of stalls is to be collected comprises: an issue unit (ISU) and a load/store unit (LSU).

13. The system of claim 12, wherein the stall types for the LSU for each of which the number is to be collected comprises: rejects, cache misses, and store instructions.

14. The system of claim 11, wherein the total number of stalls due to each component is high-level information, and the number of each stall type due to each component is low-level information that is more granular than the high-level information.

15. The system of claim 11, wherein the bottleneck identification computer program, when executed by the processor, further cause the processor to report, for each section of the executable code or of the high-level source code of the target computer program:
- a name of the section;
- an execution delay in the section;
- an address range of the section;
- whether the section contributed to the bottleneck condition; and
- if the section contributed to the bottleneck condition, the number of stalls of the particular component attributable to the section and the number each stall type of the particular component attributable to the section.

* * * * *